United States Patent
Seebaluck et al.

(10) Patent No.: US 10,466,124 B2
(45) Date of Patent: Nov. 5, 2019

(54) IN-SITU FUNCTIONALITY TEST FEATURE FOR ADVANCE PNEUMATIC DETECTOR

(71) Applicant: Kidde Technologies, Inc., Wilson, NC (US)

(72) Inventors: Dharmendr Len Seebaluck, Wake Forest, NC (US); Aaron Stanley Rogers, Surf City, NC (US)

(73) Assignee: Kidde Technologies, Inc., Wilson, NC (US)

( * ) Notice: Subject to any disclaimer, the term of this patent is extended or adjusted under 35 U.S.C. 154(b) by 330 days.

(21) Appl. No.: 15/383,390

(22) Filed: Dec. 19, 2016

(65) Prior Publication Data

US 2018/0172529 A1 Jun. 21, 2018

(51) Int. Cl.
| | | |
|---|---|---|
| *G01L 9/00* | (2006.01) | |
| *G01L 19/00* | (2006.01) | |
| *G01L 19/14* | (2006.01) | |

(52) U.S. Cl.
CPC ........ *G01L 9/0041* (2013.01); *G01L 19/0015* (2013.01); *G01L 19/14* (2013.01)

(58) Field of Classification Search
USPC .................................................. 73/700–756
See application file for complete search history.

(56) References Cited

U.S. PATENT DOCUMENTS

| | | |
|---|---|---|
| 3,122,728 A | 2/1964 | Lindberg, Jr. |
| 9,135,801 B2 | 9/2015 | Hatsir |
| 9,153,400 B2 | 10/2015 | Frasure et al. |
| 9,208,980 B2 | 12/2015 | Wallace et al. |
| 9,342,969 B2 | 5/2016 | Frasure et al. |
| 2003/0111004 A1* | 6/2003 | Enzaki .................... G01L 7/166 116/267 |
| 2004/0123668 A1* | 7/2004 | Mouhebaty ........... G01L 9/0089 73/723 |
| 2014/0177675 A1 | 6/2014 | Rennie et al. |
| 2014/0262723 A1 | 9/2014 | Frasure et al. |
| 2014/0266746 A1 | 9/2014 | Rennie et al. |
| 2015/0097677 A1 | 4/2015 | Frasure et al. |
| 2015/0137980 A1 | 5/2015 | Hatsir |
| 2015/0348386 A1 | 12/2015 | Frasure et al. |

FOREIGN PATENT DOCUMENTS

| | | |
|---|---|---|
| CN | 202267572 U | 6/2012 |
| EP | 2747114 A1 | 6/2014 |
| EP | 2950286 A1 | 12/2015 |
| GB | 2001464 A | 1/1979 |
| GB | 2322449 A | 8/1998 |
| JP | H11339151 A | 12/1999 |

OTHER PUBLICATIONS

Extended European Search Report for EP Application No. 17193260.1, dated Apr. 3, 2018, 11 Pages.

* cited by examiner

*Primary Examiner* — Andre J Allen
(74) *Attorney, Agent, or Firm* — Kinney & Lange, P.A.

(57) ABSTRACT

An advance pneumatic detector to indicate pressure changes in an environment includes a switch, a pressure tube, an endcap, a piston, and a magnet. The pressure tube is connected to the switch. The endcap is disposed on an end of the pressure tube opposite from the switch. The piston is disposed within and forms a seal against the pressure tube. The piston is slidably engaged with the pressure tube. The magnet is slidably attached to and surrounds a portion of the pressure tube. The magnet is configured to control the positioning of the piston within the pressure tube.

4 Claims, 8 Drawing Sheets

IN-SITU FUNCTIONALITY TEST FEATURE FOR ADVANCE PNEUMATIC DETECTOR

BACKGROUND

The present disclosure relates to an advance pneumatic detector ("APD"). In particular, the disclosure relates to an APD with a test feature for detecting the state of the APD.

An APD is typically comprised of both an alarm switch and a fault switch. APDs can utilize a pressure tube that contains a gas that will expand as it is heated, thus increasing the pressure in the pressure tube. An alarm switch is used to indicate overheat or fire situations. An alarm switch includes a deformable diaphragm that is at a normal state when the system is at a normal pressure. As the pressure increases in the pressure tube, the diaphragm deforms and closes an electrical circuit, indicating that there is an alarm condition in the system. A fault switch is used to indicate whether there are leaks, disconnects, or other problems in the APD. A fault switch includes a deformable diaphragm that is deformed when the system is at a normal pressure. If the pressure drops below normal, the diaphragm of the fault switch resumes its normal state and opens an electrical circuit, indicating that there is a fault condition in the system.

APDs utilizing both an alarm switch and a fault switch are used on aircraft to detect alarm and fault conditions. The pressure tubes for the alarm and fault switches can typically run anywhere from one foot long to fifty feet long, and can be placed in systems that are prone to overheating or fires. With existing APDs used in aircraft applications, such as in the engine or wing, there are no current designs that allow for in-situ testing to verify and confirm whether a switch of the APD is still functioning. Currently, to determine whether the APD is functional, the APD must be removed from the aircraft and subjected to high heat or extreme cold (e.g., liquid nitrogen bath) in order to reset the switch and/or provide indication for a low-pressure state or latent failure mode.

SUMMARY

An advance pneumatic detector to indicate pressure changes in an environment includes a switch, a pressure tube, an endcap, a piston, and a magnet. The pressure tube is connected to the switch. The endcap is disposed on an end of the pressure tube opposite from the switch. The piston is disposed within and forms a seal against the pressure tube. The piston is slidably engaged with the pressure tube. The magnet is slidably attached to and surrounds a portion of the pressure tube. The magnet is configured to control the positioning of the piston within the pressure tube.

A method for testing a switch in an advance pneumatic detector with a pressure tube includes moving a piston within the pressure tube with a magnet. A pressure of a gas in a portion of the pressure tube is adjusted in response to moving the piston. A state of the switch is monitored.

A method of assembling an advance pneumatic detector includes placing a piston within a pressure tube of a switch of the advance pneumatic detector. The switch is charged with gas. The switch is hermetically sealed. The advance pneumatic detector is calibrated. A magnet is positioned to surround a portion of the pressure tube such that the magnet is slidably engaged with the pressure tube.

DETAILED DESCRIPTION

In general, the proposed APD incorporates a pressure tube with a magnetic piston element, the position of which is controlled by a magnet external to the pressure tube. Without needing to remove the APD from the aircraft, the magnet can be moved longitudinally along to the pressure tube in order to move the piston and change the pressure in the pressure tube thereby tripping the switch. The benefit of the proposed APD is the elimination of the requirement of removing the APD from the aircraft thereby saving large amounts of time during routine inspections of the aircraft.

Figure 1:
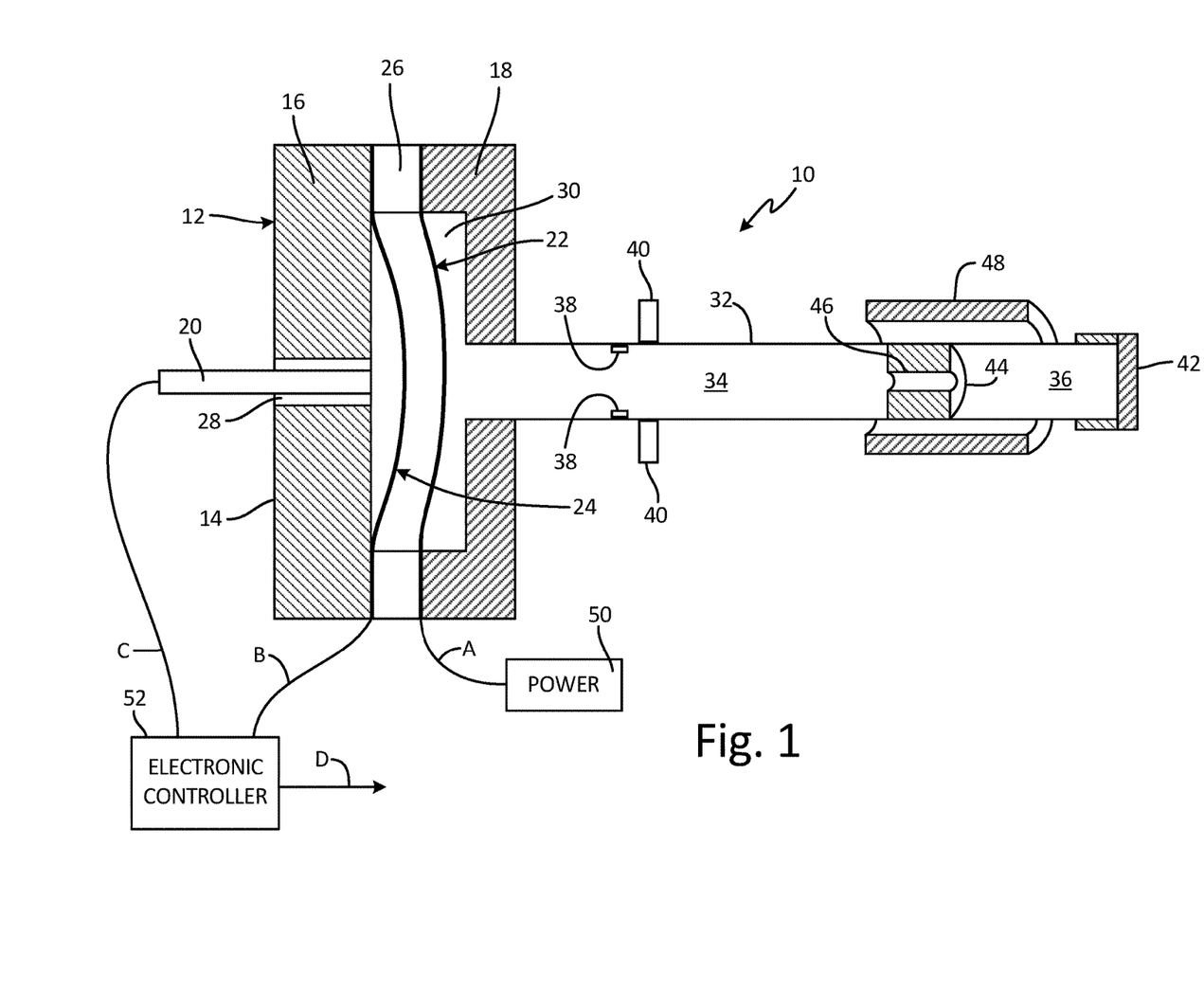
FIG. 1 is a side cross-sectional view of an APD with a switch, a pressure tube, and a piston.

FIG. 1 shows a side cross-sectional view of APD 10. APD 10 includes switch 12, housing 14 (including first retainer portion 16 and second retainer portion 18), contact pin 20, fault diaphragm 22, alarm diaphragm 24, insulator 26, insulator 28, cavity 30, pressure tube 32 (including first chamber 34, second chamber 36, internal stops 38, and external stops 40), endcap 42, piston 44 (including passage 46), magnet 48, power source 50, and electronic controller 52. APD 10 also includes path A, path B, path C, and path D. Similar configurations are disclosed in U.S. patent application Ser. Nos. 13/836,675, 14/287,969, and 14/515,886 by Applicant Kidde Technologies, Inc., which are incorporated herein by reference in their entirety.

APD 10 is a linear thermal sensor with integrated alarm and fault switches. Switch 12 is a discrete pressure switch configured to detect changes in pressure within switch 12 due to temperature changes external to switch 12. Housing 14 is a rigid casing that encloses switch 12. First retainer portion 16 and second retainer portion 18 are portions of housing 14. First retainer portion 16 and second retainer portion 18 are constructed out of a refractory metallic material that is capable of conducting an electrical signal. Refractory materials are used so that first retainer portion 16 and second retainer portion 18 can maintain their strength when first retainer portion 16 and second retainer portion 18 are subject to high temperatures. Contact pin 20 is a rod of solid, electrically conductive material. In one non-limiting embodiment, contact pin 20 is formed of metallic material.

Fault diaphragm 22 and alarm diaphragm 24 are semi-rigid deformable sheets of solid electrically conductive material. Fault diaphragm 22 and alarm diaphragm 24 can be constructed out of refractory metallic materials. Fault diaphragm 22 and alarm diaphragm 24 can have any thickness that allows fault diaphragm 22 and alarm diaphragm 24 to deform. Fault diaphragm 22 has a smaller thickness in the embodiment shown so that it deforms at lower pressures than alarm diaphragm 24. This allows switch 12 to be used to indicate different pressure levels corresponding to alarm and fault conditions. Insulator 26 and insulator 28 are pieces of solid material. Insulator 26 and insulator 28 can be made of any material that is capable of acting as an electrical insulator. Cavity 30 is a space within housing 14 that is in communication with pressure tube 32.

Pressure tube 32 is a tube of solid material containing an inert gas such as helium or hydrogen. In one non-limiting embodiment, pressure tube 32 includes a metallic material such as stainless steel 321. Pressure tube 32 can have a typical length between 0.305 meters (1 foot) and 15.24 meters (50 feet) depending on where APD 10 will be used. A diameter of pressure tube 32 can include approximately 0.063 inches (1.600 millimeters). First chamber 34 and second chamber 36 are hollow portions of pressure tube 32 on opposite sides of piston 44. Internal stops 38 are pieces of solid material extending radially inward form pressure tube 32. External stops 40 are pieces of solid material extending radially outward from pressure tube 32. Endcap 42 is a cover including a solid material that seals the outer end of pressure tube 32.

Piston 44 is a disk or cylinder of solid material. In one non-limiting embodiment, piston 44 includes a material that is metallic and/or magnetized such as a permanent magnet or an electromagnet. Passage 46 is channel configured to communicate a fluid (the gas within pressure tube 32) between first chamber 34 and second chamber 36. Magnet 48 is a piece of solid material that is magnetized and is longitudinally movable along the exterior of pressure tube 32. Magnet 48 can include a permanent magnet or an electromagnet. In one non-limiting embodiment, magnet 48 includes a series or combination of permanent magnets and/or electromagnets disposed along pressure tube 32. Magnet 48 can include a cuff or cylindrical shape. Power source 50 is any power source capable of supplying electric power to switch 12. Electronic controller 52 is a controller for sending and receiving electrical signals. Electronic controller 52 is configured to alert the pilot of a thermal or fire condition.

In one non-limiting embodiment, APD 10 is installed on an aircraft in one of the main landing gear wheel wells, the main engine, or the auxiliary power unit. Switch 12 includes housing 14 that is constructed of first retainer portion 16 and second retainer portion 18. First retainer portion 16 and second retainer portion 18 are connected to one another with insulator 26 positioned between them so that retainer portions 16 and 18 are electrically isolated from one another. Housing 14 includes cavity 30 that is bound by first retainer portion 16, second retainer portion 18, and insulator 26. First retainer portion 16 contains contact pin 20 with insulator 28 running between first retainer portion 16 and contact pin 20. Second retainer portion 18 contains pressure tube 32.

Contact pin 20 is held in first retainer portion 16 with insulator 28 running between contact pin 20 and first retainer portion 16. Fault diaphragm 22 and alarm diaphragm 24 are held between first retainer portion 16 and second retainer portion 18 in cavity 30. Fault diaphragm 22 is held in switch 12 between insulator 26 and second retainer portion 18. Alarm diaphragm 24 is held in switch 12 between first retainer portion 16 and insulator 26. Insulator 26 is located between first retainer portion 16 and second retainer portion 18 to insulate the two portions and to prevent electrical signals from being passed between them. Insulator 28 is located between first retainer portion 16 and contact pin 20 to insulate them and to prevent electrical signals from being passed between them. Cavity 30 is positioned between first retainer portion 16 and second retainer portion 18.

Pressure tube 32 runs through second retainer portion 18 and fluidly connects to cavity 30. Pressure tube 32 also extends into cavity 30. Pressure tube 32 is capped on an end opposite from switch 12 by endcap 42. First chamber 34 and second chamber 36 are located within pressure tube 32 and are separated by piston 44. First chamber 34 and second chamber 36 are fluidly connected via passage 46. First chamber 34 is fluidly connected to cavity 30 of switch 12. First chamber 34 is disposed between housing 14 and piston 44. Second chamber 36 is disposed between piston 44 and endcap 42. Internal stops 38 are connected to an inner surface of pressure tube 32 and extend into a pathway of piston 44. External stops 40 are connected to an external surface of pressure tube 32 and extend into a pathway of magnet 48. In a non-limiting embodiment, external stops 40 can be integrally formed with pressure tube 32. In another non-limiting embodiment, external stops 40 can be removably attached onto pressure tube 32. Endcap 42 forms a mechanical and hermetic seal with an end of pressure tube 32 opposite from switch 12.

Piston 44 is disposed within and forms a seal against pressure tube 32. Piston 44 is slidably engaged with pressure tube 32. Piston 44 divides pressure tube 32 into first chamber 34 and second chamber 36. Passage 46 extends through piston 44 and fluidly connects first chamber 34 and second chamber 36 of pressure tube 32. Magnet 48 extends around at least a portion of pressure tube 32. Magnet 48 is slidably attached to and surrounds a portion of pressure tube 32. Magnet 48 is configured to control the positioning of piston 44 due to a magnetic field of magnet 48 interacting with piston 44 and applying a magnetic force, which causes piston 44 to move within pressure tube 32. In one non-limiting embodiment, magnet 48 is attached to pressure tube 32 after APD 10 is installed onto the aircraft. In another non-limiting embodiment, magnet 48 is attached to pressure tube 32 before APD 10 is installed onto the aircraft.

Power source 50 is connected to fault diaphragm 22 along path A. Electronic controller 52 is connected to alarm diaphragm 24 along path B and to contact pin 20 along path C. Path D exits electronic controller 52 to send a signal to an electronic component that will indicate what type of pressure conditions are present in switch 12. These electronic components can include electrical equipment in the cockpit of an aircraft.

Pressure tube 32 contains a gas that expands as it is heated, therefore as pressure tube 32 is heated the pressure in pressure tube 32 will increase. As the pressure in pressure tube 32 increases, the pressure in cavity 30 will also increase. The pressure in cavity 30 can cause fault diaphragm 22 and alarm diaphragm 24 to deform. In the embodiment shown in FIG. 1, there is no pressure in switch 12 and fault diaphragm 22 and alarm diaphragm 24 are in their normal configuration (for example, occupying a convex shape towards pressure tube 32). Pressure tube 32 will be placed next to aircraft components that are capable of overheating or components where a fire could occur, such as the landing gear wheel well, the engine, or the auxiliary power unit.

The state of switch 12 is tested by activating switch 12 due to a change in pressure in pressure tube 32 caused by movement of piston 44 by magnet 48. As magnet 48 is moved in longitudinal direction (right to left in FIG. 1) relative to pressure tube 32, the magnetic field of magnet 48 interacts with piston 44. Movement of magnet 48 causes piston 44 to move linearly within pressure tube 32. As piston 44 is moved, pressure of a gas within first chamber 34 of pressure tube 32 is adjusted in response moving piston 44. The gas in first chamber 34 becomes compressed which in turn increases the pressure of the gas within first chamber 34 and cavity 30. At least one of fault diaphragm 22 and alarm diaphragm 24 can be activated in response to the pressure adjustment of the gas in pressure tube 32 and cavity 30. An electrical signal is activated to indicate the state of fault diaphragm 22 and alarm diaphragm 24.

Internal stops 38 protrude into the pathway of piston 44 and prevent piston 44 from moving too close to housing 14. Internal stops 38 mechanically prevent piston 44 from moving past a certain point in pressure tube 32. Likewise, external stops 40 protrude into the pathway of magnet 48 and prevent magnet 48 from moving too close to housing 14. External stops 40 mechanically prevent magnet 48 from moving past a certain point along pressure tube 32.

For example, as magnet 48 is moved towards housing 14, piston 44 also moves towards housing 14 in response to the moving magnetic field of and corresponding change in magnet force from magnet 48. As piston 44 moves towards housing 14, the pressure within first chamber 34 and cavity 30 increases which deforms at least one of fault diaphragm 22 and alarm diaphragm 24. Conversely, as magnet 48 is moved away from housing 14, piston 44 also moves away from housing 14 in response to the moving magnetic field of and corresponding change in magnet force from magnet 48. As piston 44 moves away from housing 14, the pressure within first chamber 34 and cavity 30 decreases which causes at least one of fault diaphragm 22 and alarm diaphragm 24 to form back into its original un-deformed convex shape.

Passage 46 provides a restricted orifice, weep hole, or bleed passage, which allows the gas pressure within pressure tube 32 to equalize across piston 44, for example as between first chamber 34 and second chamber 36. Passage 46 acts as a pressure relief mechanism by permitting piston 44 to move and overcome the counter-acting pressure of cavity 30. Passage 46 permits a time delay for testing to satisfy an alarm or fault persistence filter of electronic controller 52. During operation of the aircraft, passage 46 allows a small amount of time during the change state of piston 44 so that the controller in the cockpit can observe the fault/alarm state of APD 10.

In one non-limiting embodiment, a first mechanic monitors an engine fire panel in the cockpit while a second mechanic activates piston 44 with magnet 48 and moves piston 44 to one of internal stops 38. Depending on the direction of activation (movement) of piston 44, the pressure in cavity 30 increases or decreases as a step function, then decays as the seepage via passage 46 equalizes the pressure in pressure tube 32 on both sides of piston 44. Thus, the first mechanic in the cockpit observes the engine fire panel alarm light go from OFF to ON to OFF, which indicates that switch 12 was activated into both states. The first mechanic then tells the second mechanic to move piston 44 with magnet 48 to another stop and the process is repeated for to indicate an integrity or fault condition.

With existing APDs, once they are bolted onto the aircraft they may never change state and can be attached to the aircraft for 25+ years with no means for checking the state of the switch. Existing APDs require complete removal of the APD from the aircraft in order to assess the states of the diaphragms in the switch. Existing APDs must be removed completely from the aircraft and inserted into a high temperature oven or kiln to exercise the alarm switch and then introduced into dry ice or liquid nitrogen to lower the gas pressure sufficiently to exercise the fault switch. This process is undesirable for the aircraft service and maintenance due to the large amount of time it takes to remove the APD assembly from the aircraft.

With piston 44 and magnet 48, a state of APD 10 can be tested without the need for removing APD 10 entirely from the aircraft. Piston 44 and magnet 48 provide a non-invasive means of going out onto the aircraft, opening up an area of the aircraft containing APD 10, and charging the gas pressure in first chamber 34 of pressure tube 32 with piston 44, and modulate the pressure in pressure tube 32 to activate switch 12 into different test, alarm, fault, or normal states. Additionally, pre-installing magnet 48 onto pressure tube 32 helps to limit the amount of ground support equipment necessary during servicing of the aircraft.

Figure 1A:
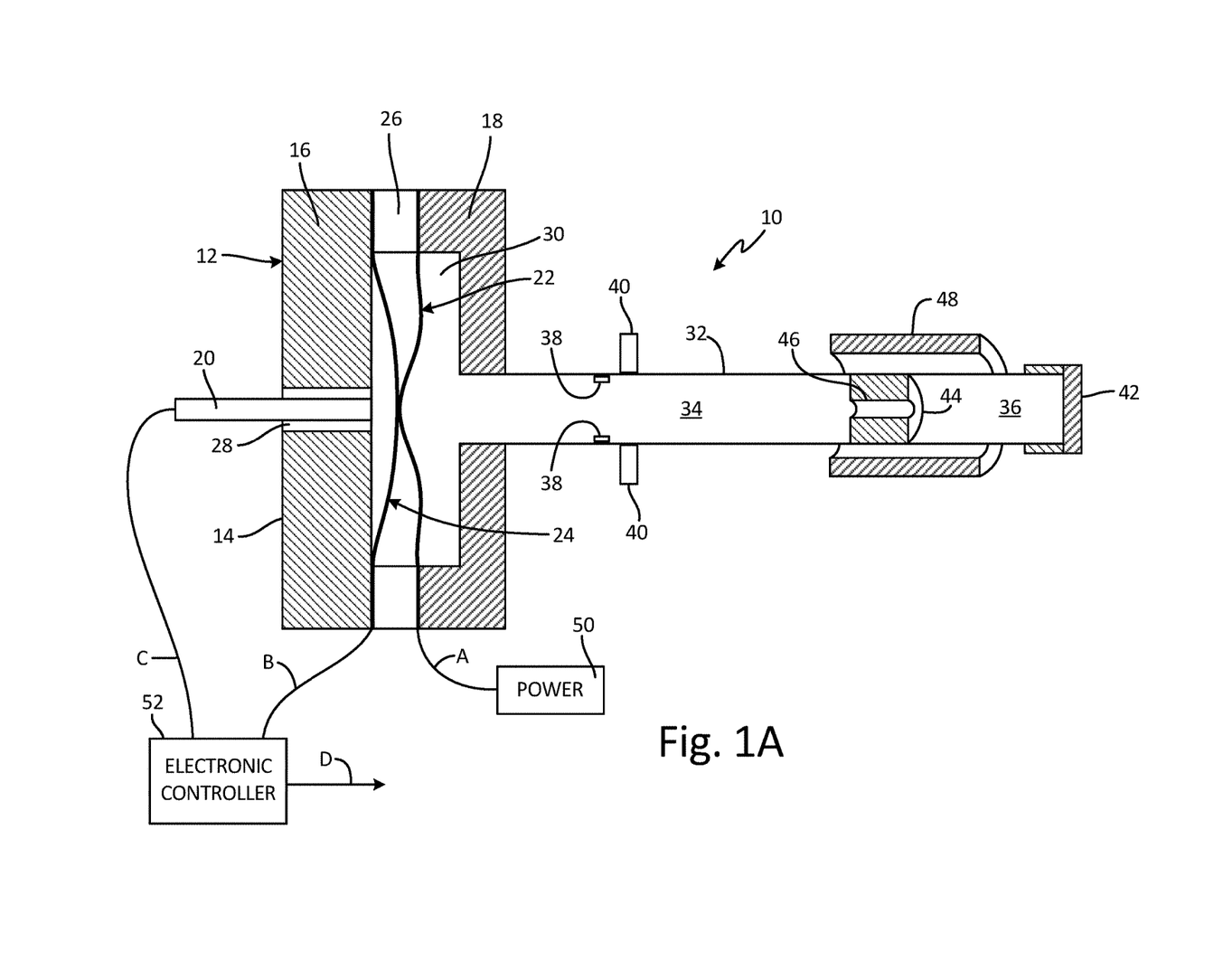
FIG. 1A is a side cross-sectional view of the APD of FIG. 1 with the switch in a first position.

FIG. 1A is a side cross-sectional view of switch 12 in system 40 at normal pressure conditions during operation of the aircraft. In the embodiment shown, normal pressure conditions exist under normal operating temperatures. Normal operating temperatures exist between a pre-set fault temperature and a pre-set alarm temperature. The pre-set fault temperature defines a lower limit of the normal operating temperatures and is the point at which pressure conditions will drop below normal. Fault diaphragm 22 will deform when the temperature rises above the pre-set fault temperature. The pre-set alarm temperature defines an upper limit of the normal operating temperatures and is the point at which pressure conditions will rise above normal. Alarm diaphragm 24 will deform when the temperature rises above the pre-set alarm temperature. Normal pressure conditions thus exist between the pre-set fault temperature and the pre-set alarm temperature. At normal pressure conditions, fault diaphragm 22 deforms and comes into contact with alarm diaphragm 24.

Under normal pressure conditions, an electronic signal is being sent through fault diaphragm 22 from power source 50. When fault diaphragm 22 comes into contact with alarm diaphragm 24 under normal pressure conditions, an electrical circuit between the two is closed and the electrical signal from power source 50 will travel through fault diaphragm 22 to alarm diaphragm 24. This electrical signal can then travel through alarm diaphragm 24 and along path B to electronic controller 52. Electronic controller 52 will register this electrical signal and will send out a signal along path D indicating that there are normal pressure conditions in switch 12.

Utilizing switch 12 in pneumatic detectors is advantageous, as switch 12 can send a signal that indicates a system is at a steady state. This allows a user to verify that the pneumatic detector is operable and that the system is functioning normally.

Figure 1B:
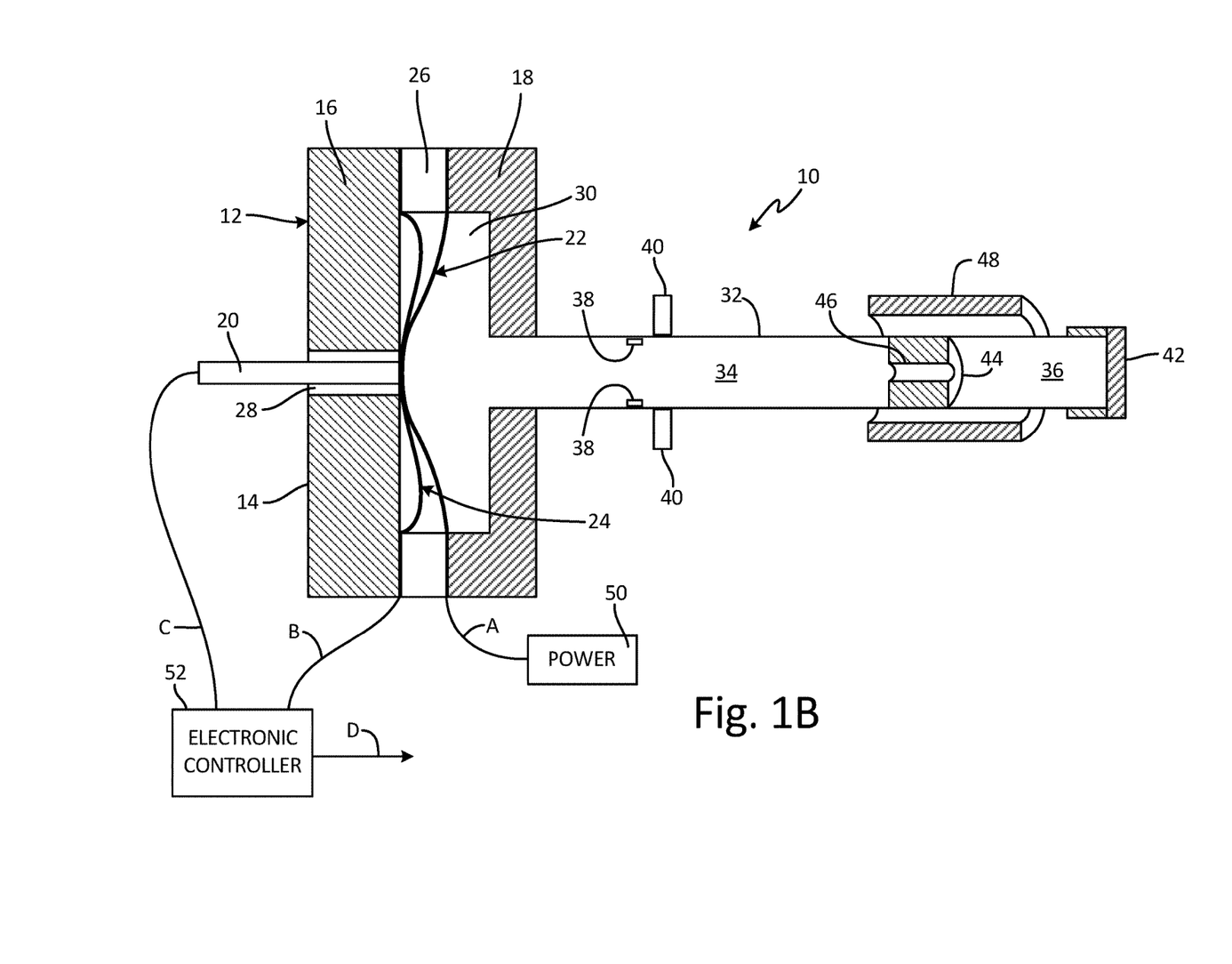
FIG. 1B is a side cross-sectional view of the APD of FIG. 1 with the switch in a second position.

FIG. 1B is a side cross-sectional view of the integrated switch of FIG. 1A at a higher than normal pressure conditions during operation of the aircraft. Above normal pressure conditions exist at temperatures above the pre-set alarm temperature. In the embodiment shown, the pre-set alarm temperature of the sensor is 316 degrees Celsius (600.00 degrees Fahrenheit). Temperatures above the pre-set alarm temperature of the sensor will cause above normal pressure conditions. In alternate non-limiting embodiments, the pre-set alarm temperature of the sensor can vary based on the thickness of alarm diaphragm 24 in switch 12 and the quantity of gas contained in pressure tube 32. At above normal pressure conditions, both fault diaphragm 22 and alarm diaphragm 24 will deform. This will cause fault diaphragm 22 to come into contact with alarm diaphragm 24 and it will cause alarm diaphragm 24 to come into contact with contact pin 20.

In operation, an electronic signal is being sent through fault diaphragm 22 from power source 50. When fault diaphragm 22 comes into contact with alarm diaphragm 24 under normal pressure conditions, an electrical circuit between the two is closed and the electrical signal from power source 50 will travel through fault diaphragm 22 to alarm diaphragm 24. When alarm diaphragm 24 comes into contact with contact pin 20, an electrical circuit between them is closed and the electrical signal will travel through alarm diaphragm 24 to contact pin 20. This electrical signal can then travel through contact pin 20 and along path C to electronic controller 52. Electronic controller 52 will register this electrical signal and will send out a signal along path D indicating that there are above normal pressure conditions in switch 12.

Above normal pressure conditions can occur when there is a fire or overheat condition in a component, such as an engine, landing gear wheel well, or auxiliary power unit. Pressure tube 32 can run along these components. As the heat rises in or around the components, the pressure in pressure tube 32 will increase, which will increase the pressure in cavity 30 of switch 12. If the temperatures get above the pre-set alarm temperature, the pressure will get high enough to cause alarm diaphragm 24 to deform and come into contact with contact pin 20. This closes the circuit between alarm diaphragm 24 and contact pin 20 and causes an electrical signal to travel between the two. This signal will be sent to electronic controller 52. Electronic controller 52 can then send a signal indicating that there is an alarm condition in switch 12.

Figure 1C:
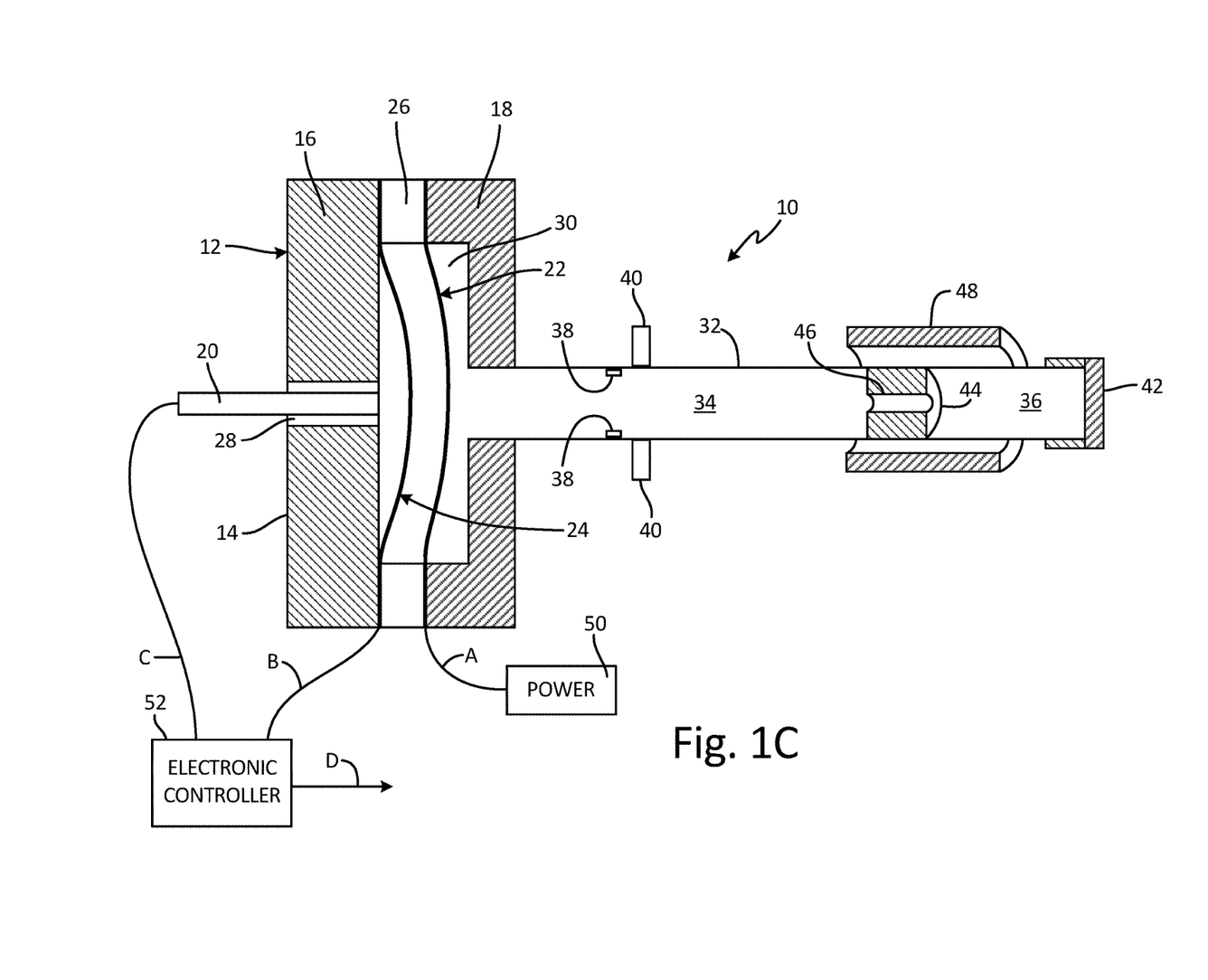
FIG. 1C is a side cross-sectional view of the APD of FIG. 1 with the switch in a third position.

FIG. 1C is a side cross-sectional view of the integrated switch of FIG. 1A at a lower than normal pressure condition during operation of the aircraft. Below normal pressure conditions exist at temperatures below the pre-set fault temperature of the sensor. In the embodiment shown, the pre-set fault temperature of the sensor is −54 degrees Celsius (−65 degrees Fahrenheit), which is the temperature at a lower limit of the normal operating temperatures. Temperatures below the pre-set fault temperature of the sensor will cause below normal pressure conditions. In alternate embodiments, the pre-set fault temperature of the sensor can vary based on the thickness of fault diaphragm 22 in switch 12. At below normal pressure conditions, both fault diaphragm 22 and alarm diaphragm 24 will be in their normal configuration and they will not be touching.

In operation, an electronic signal is being sent through fault diaphragm 22 from power source 50. Because fault diaphragm 22 is not in contact with alarm diaphragm 24 when there are below normal pressure conditions, an electrical circuit between the two is open. The electrical signal from power source 50 will not travel through fault diaphragm 22 and alarm diaphragm 24 to electronic controller 52. Electronic controller 52 will register that there is no electrical signal coming in and will send out a signal along path D indicating that there are below normal pressure conditions in switch 12.

Below normal pressure conditions can occur when there is a leak, disconnect, or other problem in pressure tube 32 or switch 12. If there is a leak or disconnect, the pressure in pressure tube 32 and cavity 30 of switch 12 will decrease. As the pressure decreases, both alarm diaphragm 24 and fault diaphragm 22 will retain their normal configurations and will not be touching. This will open the circuit between alarm diaphragm 24 and fault diaphragm 22 and will prevent a signal from traveling along path B to electronic controller 52. The lack of a signal entering electronic controller 52 will indicate that there is a fault condition in the system. Electronic controller 52 can then send a signal along path D indicating that there is a fault condition in switch 12.

Figure 2A:
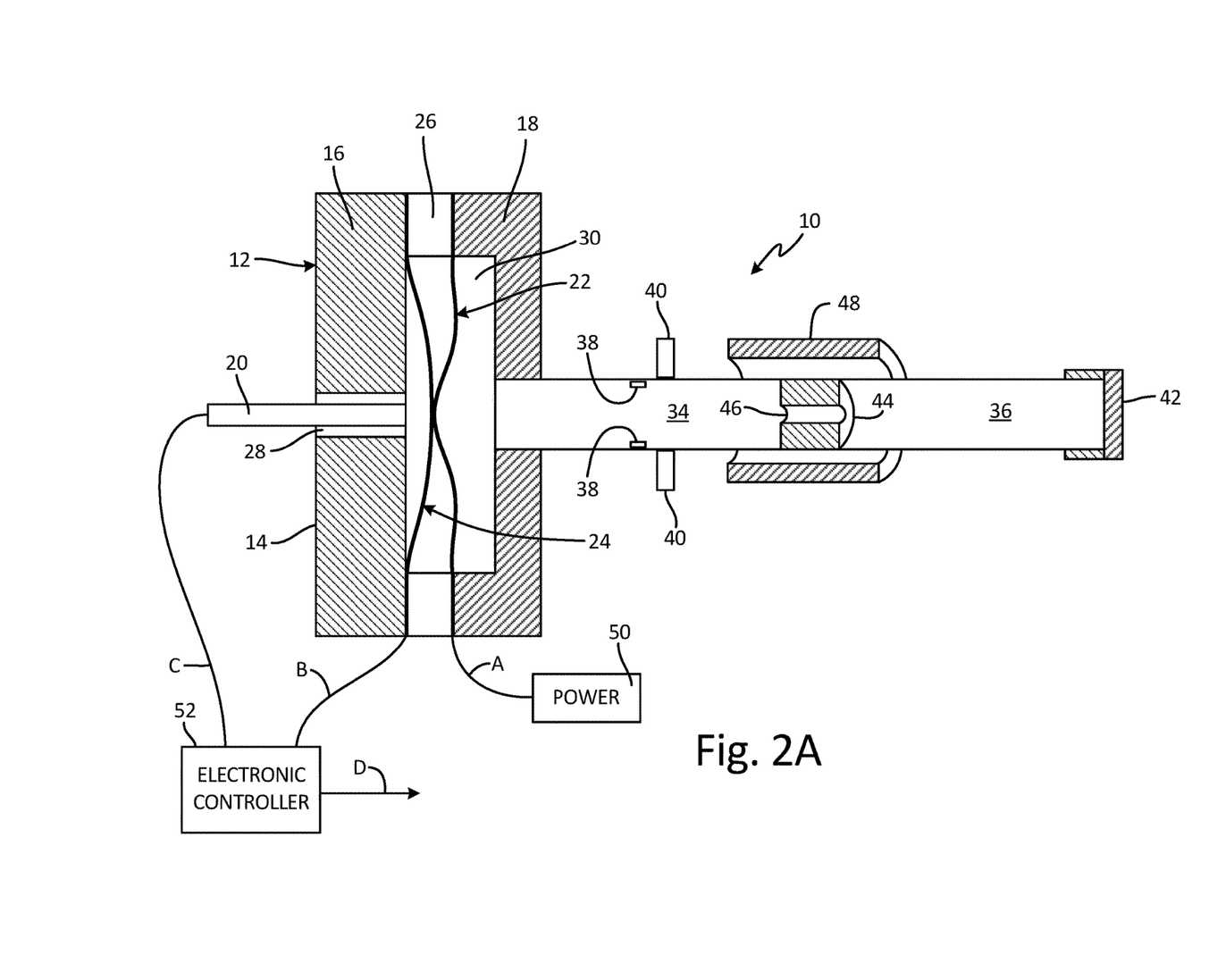
FIG. 2A is a side cross-sectional view of the APD of FIG. 1 with the piston in a first position.

FIG. 2A shows a side cross-sectional view of APD 10 with piston 44 in a first position. FIG. 2A depicts switch 12 at normal pressure conditions with piston 44 in a first position. In the embodiment shown, normal pressure conditions exist under normal operating temperatures. Normal operating temperatures exist between a pre-set fault temperature and a pre-set alarm temperature. The pre-set fault temperature defines a lower limit of the normal operating temperatures and is the point at which pressure conditions will drop below normal. Fault diaphragm 22 will deform when the temperature rises above the pre-set fault temperature. The pre-set alarm temperature defines an upper limit of the normal operating temperatures and is the point at which pressure conditions will rise above normal. Alarm diaphragm 24 will deform when the temperature rises above the pre-set alarm temperature. Normal pressure conditions thus exist between the pre-set fault temperature and the pre-set alarm temperature. At normal pressure conditions, fault diaphragm 22 deforms and comes into contact with alarm diaphragm 24.

Under normal pressure conditions, electrical power is being sent to fault diaphragm 22 from power source 50. When fault diaphragm 22 comes into contact with alarm diaphragm 24 under normal pressure conditions, an electrical circuit between the two is closed and the electric signal from power source 50 will travel through fault diaphragm 22 to alarm diaphragm 24. This electric signal can then travel through alarm diaphragm 24 and along path B to electronic controller 52. Electronic controller 52 will register this electric signal and will send out a signal along path D indicating that there are normal pressure conditions in switch 12.

In FIG. 2A, piston 44 and magnet 48 are occupying positions along pressure tube 32 where piston 44 and magnet 48 were positioned when APD 10 was assembled. Under normal operating conditions, piston 44 and magnet 48 can remain un-moved along pressure tube 32. Throughout the life cycle of the aircraft, piston 44 and/or magnet 48 may oscillate due to vibrations in APD 10 from the aircraft. As piston 44 oscillates or is jostled within pressure tube due to aircraft vibrations, passage 46 allows gas pressure to pass through passage 46 thereby equalizing a pressure differential between first chamber 34 and second chamber 36, which prevents switch 12 from activating. Without passage 46 in piston 44, small oscillations of piston 44 could cause an abrupt pressure change within cavity 30 and potential activation of at least one of fault diaphragm 22 and alarm diaphragm 24 indicating a false fault or alarm condition. Passage 46 permits piston 44 to oscillate in small linear movements if one of internal stops 38 breaks. Therefore, by not having piston 44 be so reactive to the normal pressure fluctuations experienced during a typical flight cycle, the risk of false fire warnings or false failure indications is minimized.

Utilizing the combination of piston 44 and magnet 48 with pressure tube 32 in APD 10 is advantageous because switch 12 can now send a signal that indicates which state switch 12 currently occupies without the need for completely removing APD 10 from the aircraft. This allows a user to verify that switch 12 is operable and that APD 10 is functioning normally.

Figure 2B:
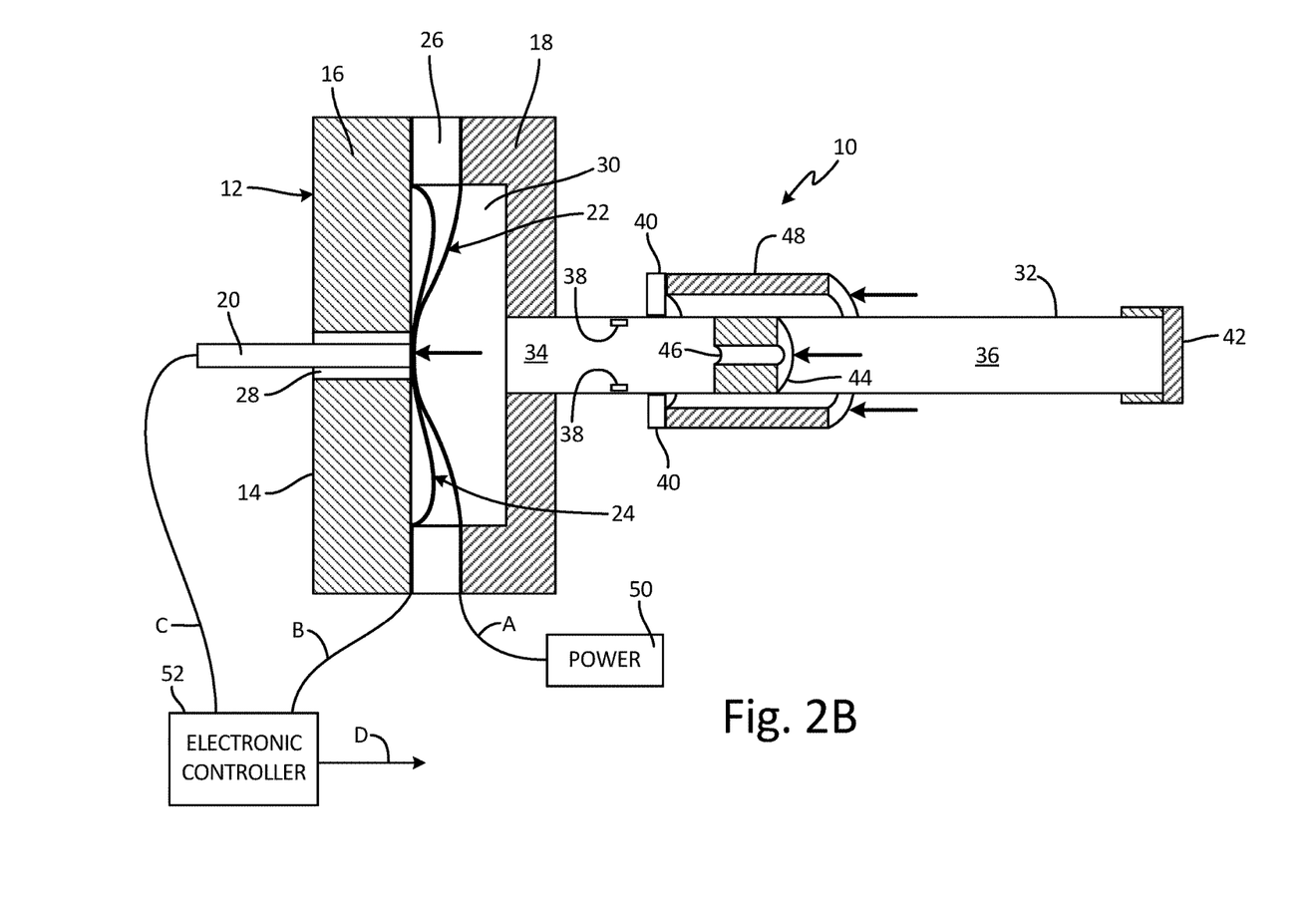
FIG. 2B is a side cross-sectional view of the APD of FIG. 1 with the piston in a second position.

FIG. 2B shows a side cross-sectional view of APD 10 with piston 44 in a second position. Piston 44 has been moved towards housing 30 (to the left in FIG. 2B) in response to moving magnet 48 towards housing 30. In response to moving piston 44, the pressure of the gas within first chamber 34 and cavity 30 has increased. In response the increased pressure of the gas in first chamber 34 and cavity 30, both fault diaphragm 22 and alarm diaphragm 24 will deform. This will cause fault diaphragm 22 to come into contact with alarm diaphragm 24 and it will cause alarm diaphragm 24 to come into contact with contact pin 20.

In operation, electrical power is being sent through fault diaphragm 22 from power source 50. When fault diaphragm 22 comes into contact with alarm diaphragm 24 in response to piston 44 moving closer to housing 14, an electrical circuit between the two is closed and the electric signal from power source 50 will travel through fault diaphragm 22 to alarm diaphragm 24. When alarm diaphragm 24 comes into contact with contact pin 20, an electrical circuit between them is closed and the electric signal will travel through alarm diaphragm 24 to contact pin 20. This electric signal can then travel through contact pin 20 and along path C to electronic controller 52. Electronic controller 52 will register this electric signal and will send out a signal along path D indicating that switch 12 occupies a first test phase, which under normal operating conditions would indicate an alarm condition.

As piston 44 is moved closer to housing 14, the pressure in pressure tube 32 will increase, which will increase the pressure in cavity 30 of integrated switch 12. If the pressure gets above a pre-set alarm pressure of switch 12, the pressure will get high enough to cause alarm diaphragm 24 to deform and come into contact with contact pin 20. This closes the circuit between alarm diaphragm 24 and contact pin 20 and causes an electric signal to travel between the two. This signal will be sent to electronic controller 52. Electronic controller 52 can then send a signal indicating that switch 12 occupies the first test phase (e.g., an alarm condition).

Figure 2C:
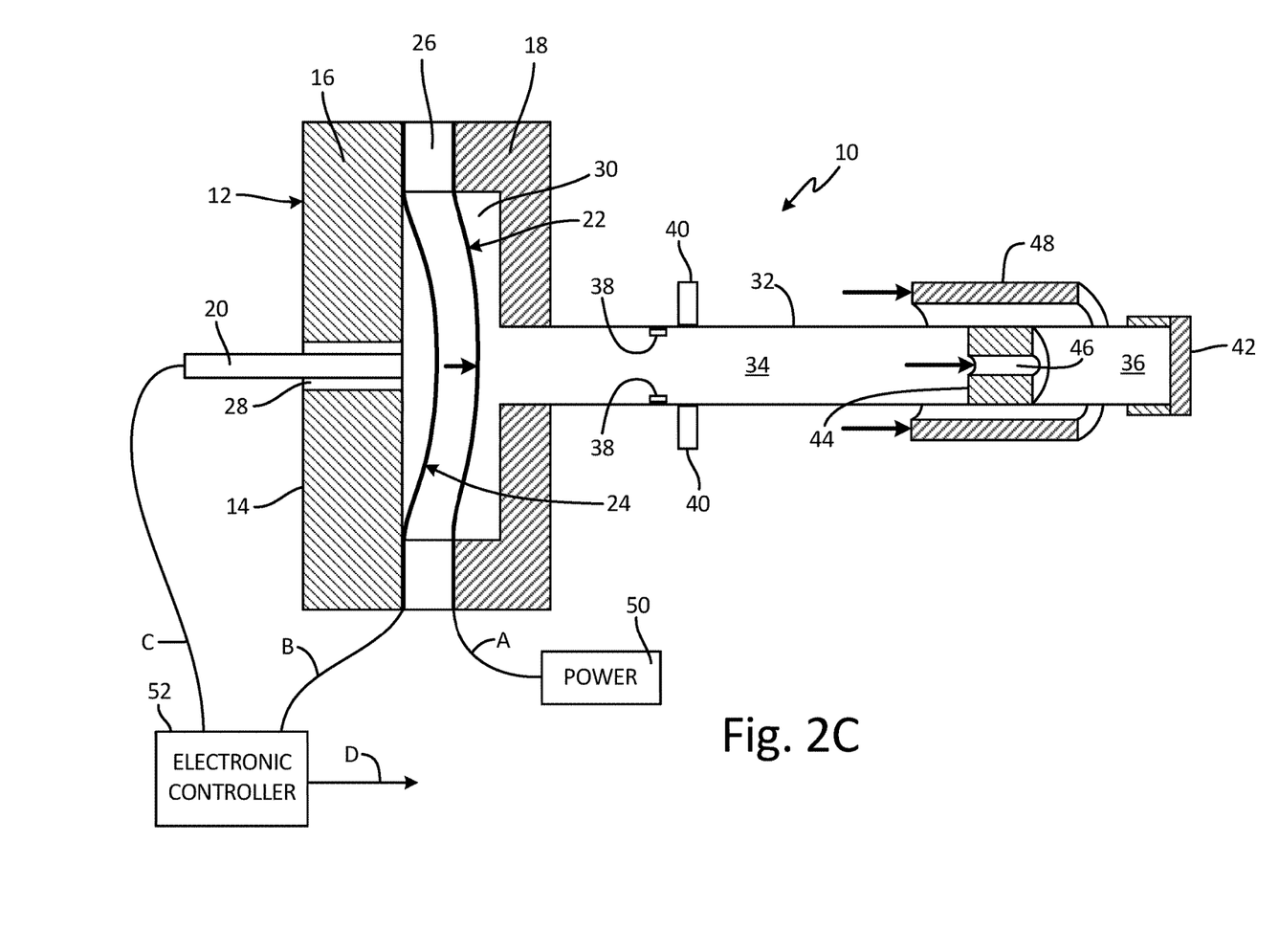
FIG. 2C is a side cross-sectional view of the APD of FIG. 1 with the piston in a third position.

FIG. 2C shows a side cross-sectional view of APD 10 with piston 44 in a third position. Piston 44 has been moved away from housing 30 (to the right in FIG. 2B) in response to moving magnet 48 away from housing 30. In response to moving piston 44, the pressure of the gas within first chamber 34 and cavity 30 has decreased. In response the decreased pressure of the gas in first chamber 34 and cavity 30, both fault diaphragm 22 and alarm diaphragm 24 will form back into a non-deformed state. This will cause both fault diaphragm 22 and alarm diaphragm 24 to come back into in their normal non-deformed configuration and they will not be touching.

In operation, an electrical signal is being sent through fault diaphragm 22 from power source 50. Because fault diaphragm 22 is not in contact with alarm diaphragm 24 when piston 44 is moved away from housing 44, an electrical circuit between the two is open. The electric signal from power source 50 will not travel through fault diaphragm 22 and alarm diaphragm 24 to electronic controller 52. Electronic controller 52 will register that there is no electric signal coming in and will send out a signal along path D indicating that switch 12 occupies a second test phase, which under normal operating conditions would indicate an fault condition.

When piston 44 is moved away from housing 14 and towards endcap 42, the pressure in first chamber 34 and cavity 30 of integrated switch 12 will decrease. As the pressure decreases in first chamber 34 and cavity 30, both alarm diaphragm 24 and fault diaphragm 22 will retain their normal configurations and will not be touching. This will open the circuit between alarm diaphragm 24 and fault diaphragm 22 and will prevent a signal from traveling along path B to electronic controller 52. The lack of a signal entering electronic controller 52 will indicate that switch 12 occupies the second test phase (e.g., fault condition). Electronic controller 52 can then send a signal along path D indicating that there is a fault condition in integrated switch 12.

FIGS. 2A-2C provide examples of a method of testing switch 12 in APD 10. The method of testing switch 12 in APD 10 can include attaching magnet 48 to pressure tube 32 of APD 10. Piston 44 is moved within pressure tube 32 with magnet 48 surrounding a portion of pressure tube 32. A pressure of a gas in a portion of pressure tube 32 is adjusted in response to moving piston 44. A state of switch 12 is monitored. Switch 12 is set in a test phase in response to the pressure adjustment of the gas in pressure tube 32. Setting switch 12 in a test phase includes activating at least one of fault diaphragm 22 and alarm diaphragm 24 located in switch 12 in response to the pressure adjustment of the gas in pressure tube 32. An electrical signal is activated to indicate the state of at least one of fault diaphragm 22 and alarm diaphragm 24. Switch 12 is set into a normal operational phase.

Figure 3:
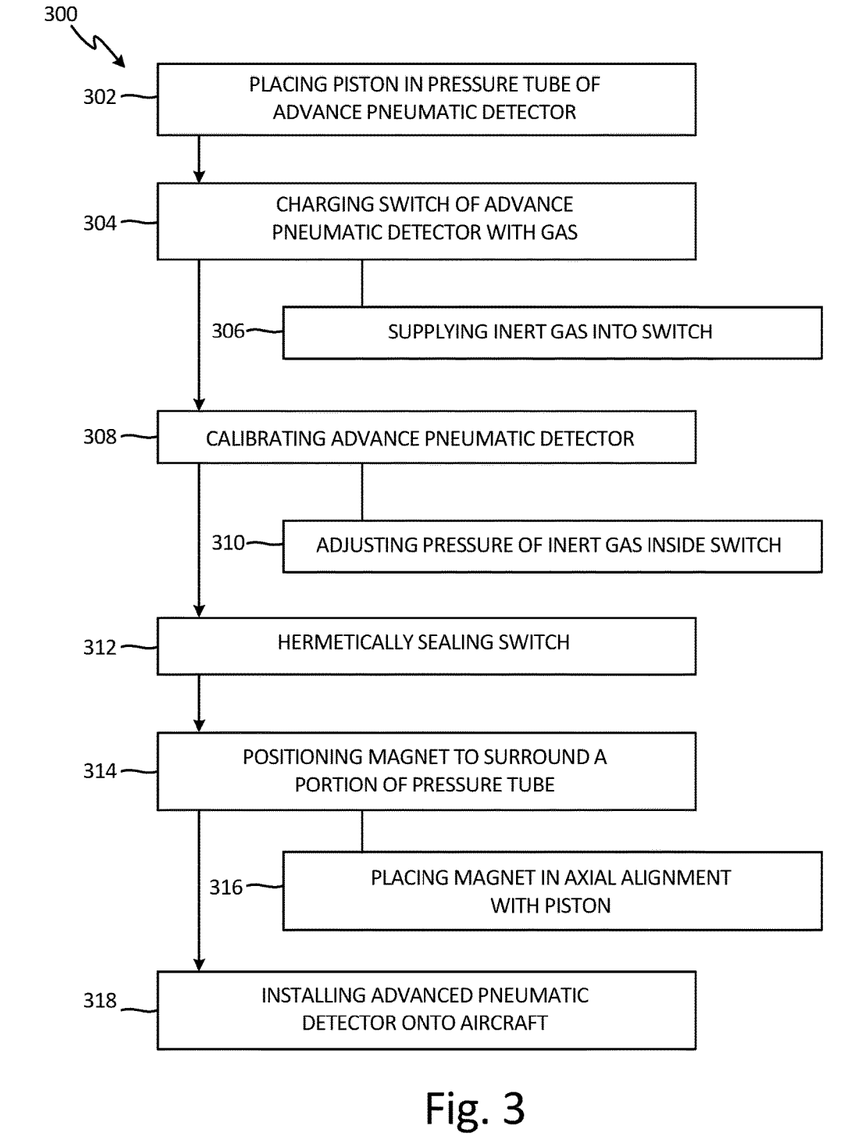
FIG. 3 is a flowchart illustrating a method of assembling the APD of FIG. 1.

FIG. 3 shows a flowchart illustrating method 300 of assembling APD 10. Method 300 includes steps 302 through 318. Step 302 includes placing piston 44 within pressure tube 32 of switch 12 of APD 10. Step 304 includes charging switch 12 with gas. Step 304 also includes step 306 of supplying an inert gas into switch 12 and pressure tube 32. The inert gas can be supplied into switch 12 through at least one of Step 308 includes calibrating APD 10. Calibrating APD 10 includes various additional steps. For example, computational fluid dynamics are used to model the engine of the aircraft. Functional hazard analysis of fire threats are completed in regions of the engine that need heat and/or fire protection. A fire threat is determined based on a maximum allowable temperature. The maximum allowable temperature is then cross-referenced with the design capabilities of APD 10. Some additional steps can be performed including determining a maximum ambient safe operating temperature, determine the full length of the alarm that is needed to fit into the aircraft element being monitored, and determine which length of alarm provides adequate localized fire detection. These steps are used to determine the temperature threshold of APD 10 as well as a sufficient length of pressure tube 32. Once the temperature threshold and length of pressure 32 are determined, a pressure of the inert gas inside switch 12 is adjusted (step 310) such that switch 12 is activated at temperatures matching the maximum ambient safe operating temperature of the location in the aircraft of pressure tube 32. Calibrating APD 10 can also include setting fault diaphragm 22 and alarm diaphragm 24 at a predetermined distance from each other (or from contact pin 20) that corresponds to a distance of travel of fault diaphragm 22 and/or alarm diaphragm 24 when pressure tube 32 reaches a predetermined pressure.

Step 312 includes hermetically sealing switch 12 by attaching endcap 42 onto the end of pressure tube 32. Step 314 includes attaching magnet 48 to a portion of pressure tube 32 such that magnet 48 is slidably engaged with pressure tube 32. Step 316 includes placing magnet 48 at an axial location of pressure tube 32 such that a portion of magnet 48 is axially aligned with a portion of piston 44. Step 318 includes installing APD 10 onto an aircraft.

Assembling APD 10 with method 300 allows APD 10 to function as discussed above and provides the benefits discussed above of being able to test the state switch 12 of APD 10 without needing to completely remove APD 10 from the aircraft.

Discussion of Possible Embodiments

The following are non-exclusive descriptions of possible embodiments of the present invention.

An advance pneumatic detector to indicate pressure changes in an environment includes a switch, a pressure tube, an endcap, a piston, and a magnet. The pressure tube is connected to the switch. The endcap is disposed on an end of the pressure tube opposite from the switch. The piston is disposed within and forms a seal against the pressure tube. The piston is slidably engaged with the pressure tube. The magnet is slidably attached to and surrounds a portion of the pressure tube. The magnet is configured to control the positioning of the piston within the pressure tube.

The advance pneumatic detector of the preceding paragraph can optionally include, additionally and/or alternatively, any one or more of the following features, configurations and/or additional components.

The switch can further comprise a housing with a cavity between a first retainer portion and/or a second retainer portion, wherein the cavity is in fluid communication with the pressure tube and the piston, a contact pin can be held in the first retainer portion, a fault diaphragm can be held in the cavity of the housing near the second retainer portion, and/or an alarm diaphragm can be held in the cavity of the housing near the first retainer portion.

At least one of the piston and the magnet can comprise a permanent magnet and/or an electromagnet.

The piston can comprise a passage that can extend through the piston.

The piston can divide the pressure tube into a first chamber and/or a second chamber, the first chamber can be between the housing and the piston and the second chamber can be between the piston and the endcap, and the passage can fluidly connect the first chamber and the second chamber.

A method for testing a switch in an advance pneumatic detector with a pressure tube can include moving a piston within the pressure tube with a magnet. A pressure of a gas in a portion of the pressure tube can be adjusted in response to moving the piston. A state of the switch can be monitored.

The method of the preceding paragraph can optionally include, additionally and/or alternatively, any one or more of the following features, configurations and/or additional components.

Monitoring the state of the switch can comprise setting the switch in a test phase in response to the pressure adjustment of the gas in the pressure tube Setting the switch in a test phase can comprise activating a diaphragm located in the switch in response to the pressure adjustment of the gas in the pressure tube.

An electrical signal to indicate the state of the diaphragm can be activated.

The switch can be set into a normal operational phase.

The magnet can be attached to the pressure tube of the advance pneumatic detector.

A method of assembling an advance pneumatic detector can include placing a piston within a pressure tube of a switch of the advance pneumatic detector. The switch can be charged with gas. The switch can be hermetically sealed. The advance pneumatic detector can be calibrated. A magnet can be positioned to surround a portion of the pressure tube such that the magnet can be slidably engaged with the pressure tube.

The method of the preceding paragraph can optionally include, additionally and/or alternatively, any one or more of the following features, configurations and/or additional components.

The advance pneumatic detector can be installed onto an aircraft.

Calibrating the advance pneumatic detector can comprise adjusting a pressure of an inert gas inside the switch.

Charging the switch can comprise inserting an inert gas into the switch and/or the pressure tube.

Attaching the magnet can comprise placing the magnet at an axial location of the pressure tube such that a portion of the magnet can be axially aligned with a portion of the piston.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An advance pneumatic detector to indicate pressure changes in an environment, the advance pneumatic detector comprising:
   a switch;
   a pressure tube connected to the switch;
   an endcap disposed on an end of the pressure tube opposite from the switch;
   a piston disposed within and forming a seal against the pressure tube, wherein the piston is slidably engaged with the pressure tube, wherein the piston comprises a passage extending through the piston; and
   a magnet slidably attached to the pressure tube, wherein the magnet is configured to control the positioning of the piston within the pressure tube.

2. The advance pneumatic detector of claim 1, wherein the switch further comprises:
   a housing with a cavity between a first retainer portion and a second retainer portion, wherein the cavity is in fluid communication with the pressure tube and the piston;
   a contact pin held in the first retainer portion;
   a fault diaphragm held in the cavity of the housing near the second retainer portion; and
   an alarm diaphragm held in the cavity of the housing near the first retainer portion.

3. The switch of claim 1, wherein at least one of the piston and the magnet comprises a permanent magnet or an electromagnet.

4. The advance pneumatic detector of claim 1, wherein the piston divides the pressure tube into a first chamber and a second chamber, the first chamber between the housing and the piston and the second chamber between the piston and the endcap, and further wherein the passage fluidly connects the first chamber and the second chamber.

* * * * *